(No Model.)

W. S. EVERETT.
VEHICLE SPRING.

No. 299,363. Patented May 27, 1884.

WITNESSES:

INVENTOR:
W. S. Everett
BY Munn & Co.
ATTORNEYS.

UNITED STATES PATENT OFFICE.

WILLARD S. EVERETT, OF HYDE PARK, MASSACHUSETTS.

VEHICLE-SPRING.

SPECIFICATION forming part of Letters Patent No. 299,363, dated May 27, 1884.

Application filed January 12, 1884. (No model.)

*To all whom it may concern:*

Be it known that I, WILLARD S. EVERETT, of Hyde Park, in the county of Norfolk and State of Massachusetts, have invented a new and Improved Spring, of which the following is a full, clear, and exact description.

This invention consists of a new form of spring, more especially intended for use on carriages, and arranged in elliptical or circular form, with an ordinary or diamond-shaped or semi-diamond-shaped base, thus combining in one spring the action of the two forms of springs.

The invention also consists in the construction and arrangement of parts, as will be hereinafter fully described and claimed.

Reference is to be had to the accompanying drawings, forming a part of this specification, in which similar letters of reference indicate corresponding parts in both the figures.

Figure 1:
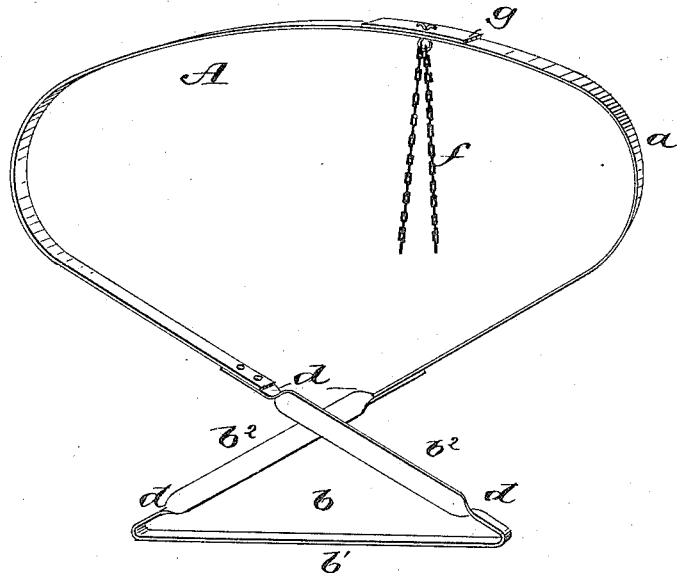
Figure 2:
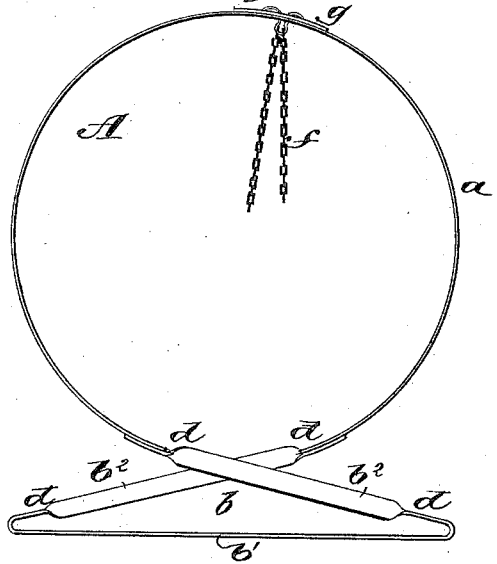

Figure 1 is a perspective view of my new and improved spring, the main portion thereof being made elliptical in form; and Fig. 2 is a front elevation of my new spring, the main portion thereof being made circular in form.

The spring A is, by preference, made in two parts—the part $a$, which is made elliptical or circular in form, and the part $b$, made, in this instance, semi-diamond-shaped. The part $a$ is made of one or more strips of steel, bent in circular or elliptical form, so that the ends come nearly together. The part $b$ is also made of one or more strips of steel shaped to form the straight portion $b'$ and arms $b^2$ $b^2$, which, in this instance, are given half-twists at $d$ $d$, and lap past each other, as shown. To the ends of the arms $b^2$ $b^2$ are secured by means of rivets the ends of the curved portion $a$ of the spring. To the upper part of the said portion $a$ of the spring are attached the straps, arms, or chains $f$, to which the object to be supported by the spring is to be secured or attached, and at the point of attachment of the chains $f$ the spring portion $a$ is provided with the short plate or leaf $g$, which stiffens the said spring $a$ at the supporting-point and distributes the load over the spring, so that no short bends will be made in the spring. Constructed in this manner the curved part $a$ and the lower part, $b$, of the spring act in conjunction, so that the spring as a whole is very elastic and strong, practical, and durable.

I am aware it is old to construct a spring of two crossed spring-braces secured at their lower ends to the axle by sleeves and set-screws, and jointed to a semi-elliptic spring at their upper ends beyond their point of crossing; also, that a spring has been constructed of a single piece of spring material, with its bottom and side arms curved inward toward the center, and with its top arm straight, and provided with a connecting-brace for joining the meeting ends of the spring material; and I do not claim any such constructions, broadly, as of my invention.

Having thus fully described my invention, I claim as new and desire to secure by Letters Patent—

The spring A, composed of the curved portion $a$ and base $b$, in combination with the chains $f$ or equivalent means for supporting the load within the interior of the spring part $a$, substantially as described.

WILLARD S. EVERETT.

Witnesses:
  H. A. WEST,
  C. SEDGWICK.